US007832327B2

(12) United States Patent  (10) Patent No.: US 7,832,327 B2
Gethmann et al.  (45) Date of Patent: Nov. 16, 2010

(54) RING SEALED DIAPHRAGM

(75) Inventors: Douglas P. Gethmann, Gladbrook, IA (US); Ross A. Schade, Ames, IA (US); David A. Arnold, Waukee, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 398 days.

(21) Appl. No.: 11/952,753

(22) Filed: Dec. 7, 2007

(65) Prior Publication Data

US 2009/0145294 A1 Jun. 11, 2009

(51) Int. Cl.
*F16K 31/126* (2006.01)
*F16K 7/00* (2006.01)
(52) U.S. Cl. .......................................... 92/100; 251/61
(58) Field of Classification Search .................. 92/94, 92/98 R, 99, 100; 251/46, 61, 61.2, 61.4
See application file for complete search history.

(56) References Cited

U.S. PATENT DOCUMENTS

| 2,809,521 | A |   | 10/1957 | Waddell |  |
|---|---|---|---|---|---|
| 2,931,179 | A | * | 4/1960 | Mayo | 92/100 |
| 2,934,307 | A | * | 4/1960 | Henderson | 251/41 |
| 3,081,847 | A |   | 3/1963 | Smitley |  |
| 3,304,880 | A | * | 2/1967 | Gold et al. | 92/100 |
| 3,486,491 | A |   | 12/1969 | White |  |
| 3,542,289 | A |   | 11/1970 | Ojala et al. |  |
| 3,933,950 | A |   | 1/1976 | Cuttitta et al. |  |
| 4,098,487 | A |   | 7/1978 | Bauer |  |
| 4,125,293 | A |   | 11/1978 | Hart |  |
| 4,196,744 | A |   | 4/1980 | Bradshaw |  |
| 4,241,757 | A |   | 12/1980 | Bron et al. |  |
| 4,269,028 | A | * | 5/1981 | Hattori | 251/61 |
| 4,626,194 | A |   | 12/1986 | Mills et al. |  |
| 4,823,750 | A |   | 4/1989 | Niida et al. |  |
| 4,864,993 | A |   | 9/1989 | Itoh et al. |  |
| 5,586,744 | A | * | 12/1996 | Smith et al. | 251/61.5 |
| 6,347,620 | B1 |   | 2/2002 | Miyake et al. |  |

(Continued)

FOREIGN PATENT DOCUMENTS

DE 2 241 551 4/1974

(Continued)

OTHER PUBLICATIONS

International Search Report for PCT/US2008/084722, mailed Mar. 16, 2009.

*Primary Examiner*—Thomas E Lazo
(74) *Attorney, Agent, or Firm*—Marshall, Gerstein & Borun LLP

(57) ABSTRACT

A diaphragm actuator for a fluid process control device comprises a housing, a diaphragm, a stem, and a plate assembly. The plate assembly includes a concave plate and a convex plate, each having inner and outer radial portions. The outer radial portions compressingly engage and retain the diaphragm. The inner radial portions are compressed together onto the stem between a shoulder of the stem and a nut threaded onto the stem. Accordingly, the concave plate forcibly engages and provides a fluid-tight seal directly with the shoulder of the stem without requiring an o-ring or any other additional sealing component. Moreover, the concave and convex plates are structurally equivalent such that the actuator may easily be switched between a biased-open configuration and a biased-closed configuration.

26 Claims, 6 Drawing Sheets

U.S. PATENT DOCUMENTS 6,827,001 B2    12/2004   Engle et al.
2006/0091339 A1*  5/2006   Young .................. 251/14

FOREIGN PATENT DOCUMENTS

| DE | 0 644 363 | 3/1995 |
| DE | 195 14 978 | 10/1996 |
| DE | 19514978 A1 * | 10/1996 |
| DE | 198 30 084 | 10/1999 |
| JP | 57-200779 | 12/1982 |

* cited by examiner

RING SEALED DIAPHRAGM

FIELD OF THE DISCLOSURE

The present disclosure relates generally to actuators for fluid process control devices and, more particularly, to actuators comprising diaphragm assemblies for fluid process control devices.

BACKGROUND

It is generally known that process plants, such as refineries, chemical plants or pulp and paper plants, consist of numerous process control loops connected together to produce various consumer products. Each of these process control loops is designed to keep some important process variable such as pressure, flow, level, or temperature, within a required operating range to ensure the quality of the end product. Each of these loops receives and internally creates load disturbances that affect the process variable and control of the process control loops within the plant. To reduce the effect of these load disturbances, the process variables are detected by sensors or transmitters and communicated to a process controller. The process controller processes this information and provides changes or modifications to the process loop to get the process variable back to where it should be after the load disturbance occurs. The modifications typically occur by changing flow through some type of final control element such as a control valve. The control valve manipulates a flowing fluid, such as gas, steam, water, or a chemical compound, to compensate for the load disturbance and maintain the regulated process variable as close as possible to the desired control or set point.

It is generally understood that various control valve configurations may be specifically applicable for certain applications. For example, when a quick-opening valve with a narrow control range is suitable, a rotary control valve, such as a butterfly valve, may be used. Alternatively, when precise control over a large control range is required, a sliding stem control valve may be used. In any configuration, such control valves are generally coupled to a control device such as an actuator, which controls the exact opening amount of the control valve in response to a control signal. Thus, when designing a process, the process engineer must consider many design requirements and design constraints. For example, the design engineer must determine the style of valve used, the size of the valve, the type of actuator, etc.

In some systems, especially in pneumatically controlled fluid process systems, the actuator for any given fluid process control device may include a diaphragm actuator. Typical diaphragm actuators comprise a housing containing a spring-biased diaphragm assembly. The diaphragm assembly is operatively coupled via a stem, or other actuator rod, to control the opening amount of the fluid process control device.

One known diaphragm assembly comprises a diaphragm and one or more diaphragm plates. The diaphragm comprises a flexible disk-shaped member constructed of a fluid-tight fabric, polymer, or other suitable material. The plates are disposed adjacent to the diaphragm and are adapted to be engaged by one or more springs disposed within the housing. Additionally, the plates provide a rigid mechanical connection to the stem. The springs serve to bias the diaphragm assembly into a predetermined position such that the actuator may bias the control device into an open or closed configuration. In one known assembly, the diaphragm is fixed to the diaphragm plate with an adhesive. In another known assembly, the diaphragm plate includes a dished portion, against which the diaphragm is sealed with a standard worm gear hose-clamp. In other known assemblies, the diaphragm is not fixed to the plate at all. However, the one or more diaphragm plates, as mentioned, are rigidly fixed to the stem of the actuator. Such fixation is generally achieved by threaded attachment. For example, in one form, the stem includes a threaded end portion disposed through a central aperture in the one or more plates. A nut is then threaded onto the threaded end portion of the stem to attach the stem to the plate(s). Additionally, however, a fluid-tight seal must be provided within the housing and between the opposing sides of the diaphragm assembly to enable accurate control of the pneumatic actuator. In one known diaphragm actuator according to that just described, one or more o-rings are provided between the stem and the plate(s).

Each of these known diaphragm assemblies require additional parts such as the o-rings and/or the hose-clamps, and therefore require additional assembly steps. Moreover, these additional parts are prone to failing, thereby decreasing the reliability of the overall device. Furthermore, such known diaphragm actuators are generally configured to operate in a single manner, for example, in either a biased open or a biased closed configuration. Thus, if and when a change in the biased configuration of the actuator is desired, a completely different actuator must be installed.

SUMMARY

One embodiment of the present invention comprises an actuator for a fluid process control device. The actuator comprises a housing, a stem, a concave plate, a convex plate, a diaphragm, and a nut. The housing comprises a first housing component and a second housing component. The stem is slidably disposed within the housing and comprises a shoulder. The concave plate comprises an inner radial portion and an outer radial portion. The inner radial portion is disposed on the stem and defines a central aperture. The convex plate also comprises an inner radial portion and an outer radial portion. The inner radial portion of the convex plate is disposed on the stem adjacent the inner radial portion of the concave plate.

In the disclosed embodiments, the diaphragm also comprises an outer radial portion and an inner radial portion. The outer radial portion of the diaphragm is compressed between the first and second housing components and the inner radial portion is compressed between the outer radial portions of the plates. The nut is disposed in threaded engagement with the stem such as to compress the inner radial portions of the concave and convex plates together such that the concave plate directly sealingly engages the shoulder of the stem.

So configured, the actuator of the disclosed embodiment advantageously compresses and seals the diaphragm while simultaneously providing direct sealing engagement with the stem of the actuator and may help reduce the parts and assembly costs associated with such components.

Additionally, in one preferred embodiment, the shoulder of the stem comprises a frustoconical surface and the central aperture of the concave plate comprises a frustoconical surface in sealing engagement with the shoulder of the stem.

In another preferred embodiment, the stem comprises a threaded end portion disposed opposite the concave and convex plates from the shoulder, wherein the nut is threaded onto the threaded end portion of the stem.

However, in an alternative embodiment, the inner radial portion of the convex plate may define a threaded aperture in direct threaded engagement with the threaded end portion of the stem, thereby eliminating the need for the nut.

In still another preferred embodiment, the diaphragm comprises an inner radial edge defining an inner opening with a circumferential bead that is disposed within a cavity defined between the concave and convex plates to assist in the retention of the diaphragm between the plates.

DETAILED DESCRIPTION

Figure 1:
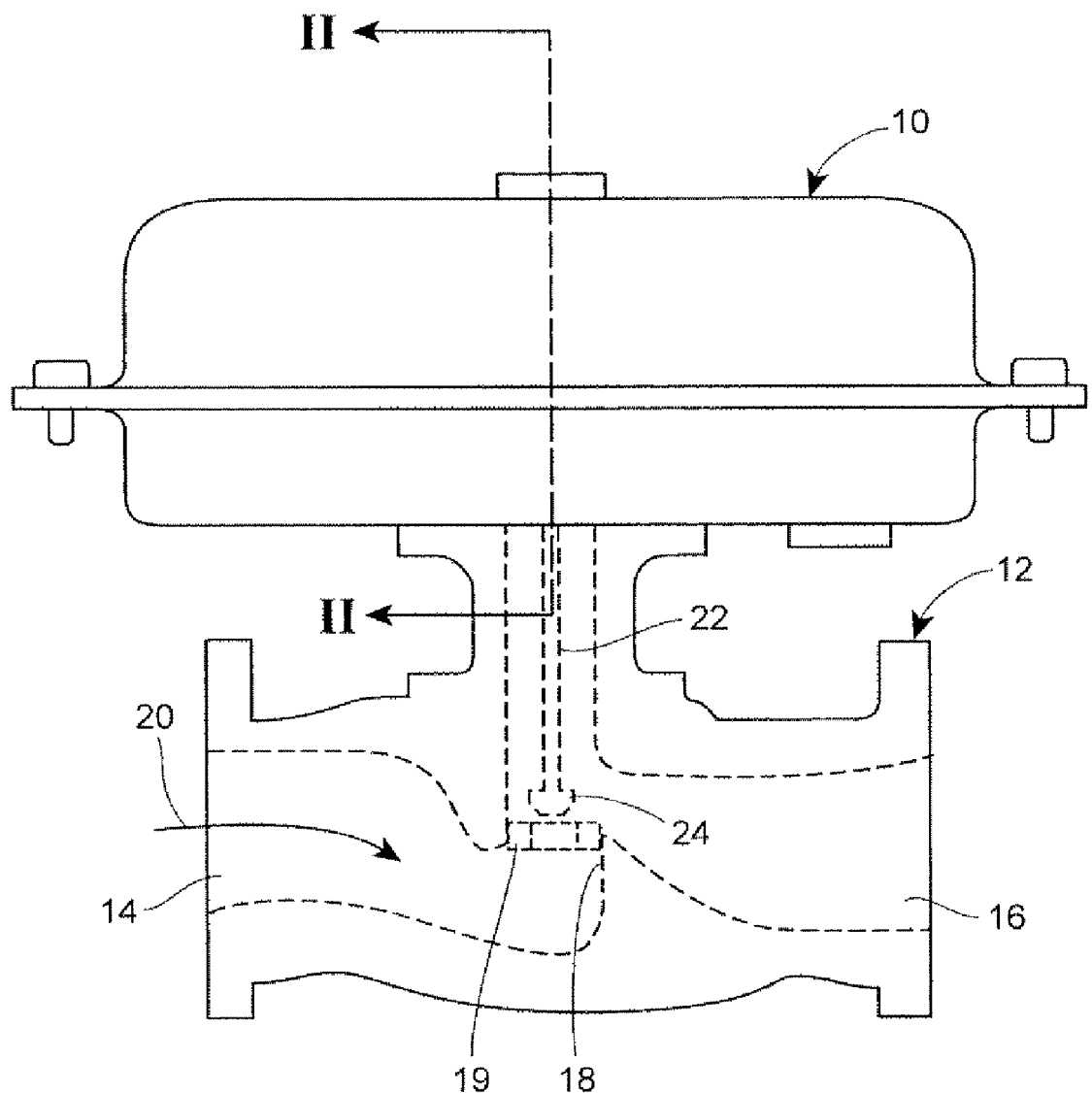
FIG. 1 is a side view of an actuator in accordance with the principles of the present invention operatively coupled to a fluid process control device.

FIG. 1 illustrates an actuator 10 constructed in accordance with the principles of the present invention and connected to a fluid process control device 12. In the example depicted in FIG. 1, the control device 12 comprises a globe valve defining an inlet 14, an outlet 16, a throat 18, and a flow-path 20. The flowpath 20 is disposed between the inlet 14 and the outlet 16. The control device 12 is adapted to be disposed within a fluid process control system including, for example, a process plant such as a refinery, or a chemical, pulp, or paper plant. The control device 12 controls the flow of a fluid through the system in accordance with one or more operating parameters.

The actuator 10 comprises a stem 22 including a valve plug 24 disposed for sliding displacement within the throat 18 of the control device 12. Therefore, during operation, the actuator 12 moves the stem 22, and therefore the plug 24, relative to a valve seat 19 disposed within the throat 18 of the control device 12. A position of the plug 24 relative to the valve seat 19 controls a quantity of fluid traveling through the flow-path 20, as may be desired for any give process application.

Figure 2:
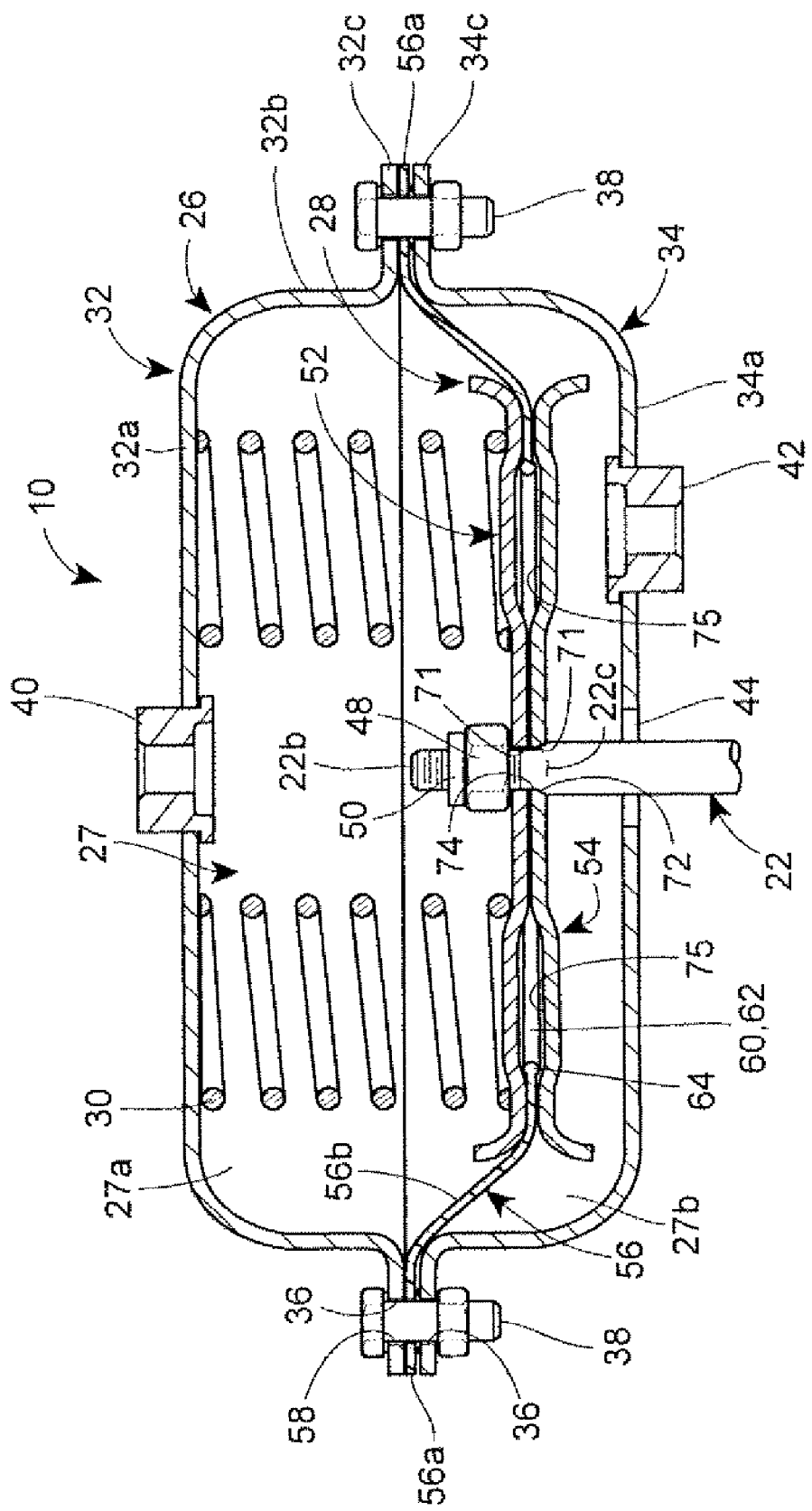
FIG. 2 is a cross-sectional side view of the actuator of FIG. 1 take through line II-II of FIG. 1.
Figure 3:
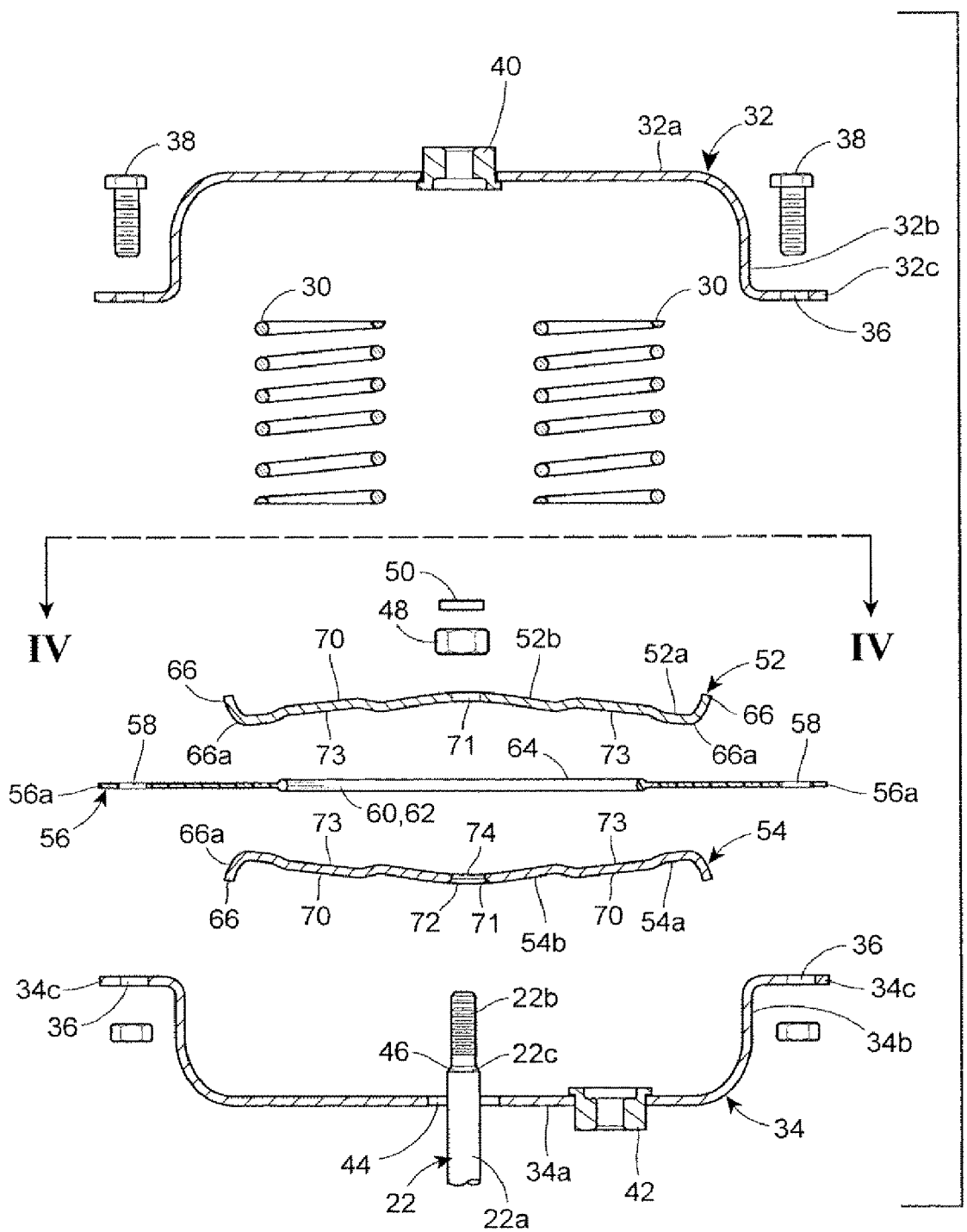
FIG. 3 is an exploded side cross-sectional view of the actuator of FIGS. 1 and 2.

With reference now to FIGS. 2 and 3, one embodiment of the actuator 10 constructed in accordance with the principles of the present invention will be described. Specifically, the actuator 10 comprises a housing 26, a diaphragm assembly 28, and a plurality of springs 30. The housing 26 defines an internal cavity 27. The diaphragm assembly 28 is disposed within the housing 26 such as to divide the internal cavity 27 into an upper cavity 27a and a lower cavity 27b. The diaphragm assembly 28 provides a fluid-tight seal between the upper and lower cavities 27a, 27b of the housing 26. In the disclosed embodiment, the springs 30 bias the diaphragm assembly 28 downward relative to the orientation of the actuator 10 depicted in FIG. 2. This downward bias positions the plug 24 (shown in FIG. 1) against the valve seat 19 to close the flow of fluid through the flow path 20, thereby defining a biased-closed actuator 10. However, a pressure may be introduced into the lower cavity 27b of the housing 26 to force the diaphragm assembly 28 upward against the bias of the springs 30, thereby lifting the plug 24 away from the valve seat 19 to open the flow path 20 of the control valve 12.

With continued reference to FIGS. 2 and 3, the housing 26 of the actuator 10 comprises an tipper housing component 32 and a lower housing component 34 Each housing component 32, 34 comprises a plate portion 32a, 34a, a wall 32b, 34b, and a flange 32c, 34c. In the disclosed embodiment, the plate portions 32a, 34a are generally circular. Therefore, the walls 32b, 34b and the flanges 32c, 34c extend circumferentially about the plate portions 32a, 34a. The radial flanges 32c, 34c define a plurality of apertures 36 for receiving fasteners 38 to secure the upper housing component 32 to the lower housing component 34, as illustrated in FIG. 2. In the disclosed embodiment, the fasteners 38 each comprise a hexagonal nut in threaded engagement with a hexagonal bolt.

Moreover, the upper housing component 32 defines a fluid port 40 and the lower housing component 34 defines a fluid port 42. The fluid ports 40, 42 are adapted to be coupled to respective fluid supply lines, such as pneumatic supply lines, for varying the pressure within the upper and lower cavities 27a, 27b of the housing 26. Further still, the lower housing component 34 defines an opening 44 for accommodating the stem 22.

The stem 22, as mentioned, operatively couples the diaphragm assembly 28 to the fluid process control device 12. The stem 22 generally comprises an elongated rod having a body portion 22a, a threaded end portion 22b, and a shoulder 22c. The body portion 22a includes a diameter that is larger than a diameter of the threaded end portion 22b. The shoulder 22c is disposed between the body portion 22a and the threaded end portion 22b The shoulder 22c defines a shoulder surface 46, which is identified in FIG. 3. In the disclosed embodiment, the shoulder surface 46 comprises a frustoconical surface that radially converges from the body portion 22a toward the threaded end portion 22b.

With continued reference to FIGS. 2 and 3, the threaded end portion 22b of the stem 22 is coupled to the diaphragm assembly 28 with a nut 48. The nut 48 of the disclosed embodiment includes a hexagonal nut threaded onto the threaded end portion 22b of the stem 22 opposite the diaphragm assembly 28 from the shoulder portion 22c. Additionally, in the disclosed embodiment, the nut 48 is retained on the stem 22 with a retaining nut 50. The retaining nut 50 is threaded onto the threaded end portion 22b of the stem 22 and into engagement with the nut 48 to prevent the nut 48 from loosening off of the stern 22. Additionally, as will be discussed below, the diaphragm assembly 28 applies a force to the nut 48, thereby preventing the nut 48 from loosening off of the stem 22.

The diaphragm assembly 28 comprises a pair of diaphragm plates 52, 54 and a diaphragm 56. The diaphragm 56 is constructed of a flexible material that may include a fabric, a polymer, a composite, and/or any other suitable material capable of providing a fluid tight seal. More specifically, the diaphragm 56 comprises an outer radial portion 56a and an inner radial portion 56b. The outer radial portion 56a defines a plurality of apertures 58 for receiving the fasteners 38 that secure the radial flange portions 32c, 34c of the upper and lower housing components 32, 34 together. So configured, the radial flange portions 32c, 34c compress the outer radial portion 56a of the diaphragm 56.

The inner radial portion 56b of the diaphragm 56 includes an inner edge 60 defining a circular opening 62, as depicted in FIG. 3. In the disclosed embodiment, the inner edge 60 comprises a bead 64 that extends the circumference of the opening 62. In the disclosed embodiment, the bead 64 includes a generally circular cross-section having a diameter that is larger than a thickness of the diaphragm 56. Accordingly, the inner radial portion 56b of the diaphragm 56 is disposed between the pair of diaphragm plates 52, 54.

More specifically, the diaphragm plates 52, 54 comprise outer radial portions 52a, 54a and inner radial portions 52b, 54b, as identified in FIG. 3. Generally, the diaphragm plates 52, 54 are substantially identical, and therefore, common features will be identified with common reference numerals. For example, the outer radial portions 52a, 54a of the diaphragm plates 52, 54 each comprise a flared edge 66 defining a rounded surface 66a. The outer radial portions 52a, 54a are adapted to compress the inner radial portion 56a of the diaphragm 56 to provide a fluid-tight seal. During use, as the diaphragm plates 52, 54 move up and down within the housing 26, the diaphragm 56 may intermittently engage the curved surfaces 66a of the flared edges 66. These curved surface 66a advantageously provide a smooth surface for the diaphragm 56 to bear against during use without puncturing, tearing, cutting, or otherwise damaging the diaphragm 56. Accordingly, the flared edges 66 serve to ensure proper operation of the actuator 10 and maximize the operational life of the diaphragm 56.

Figure 4:
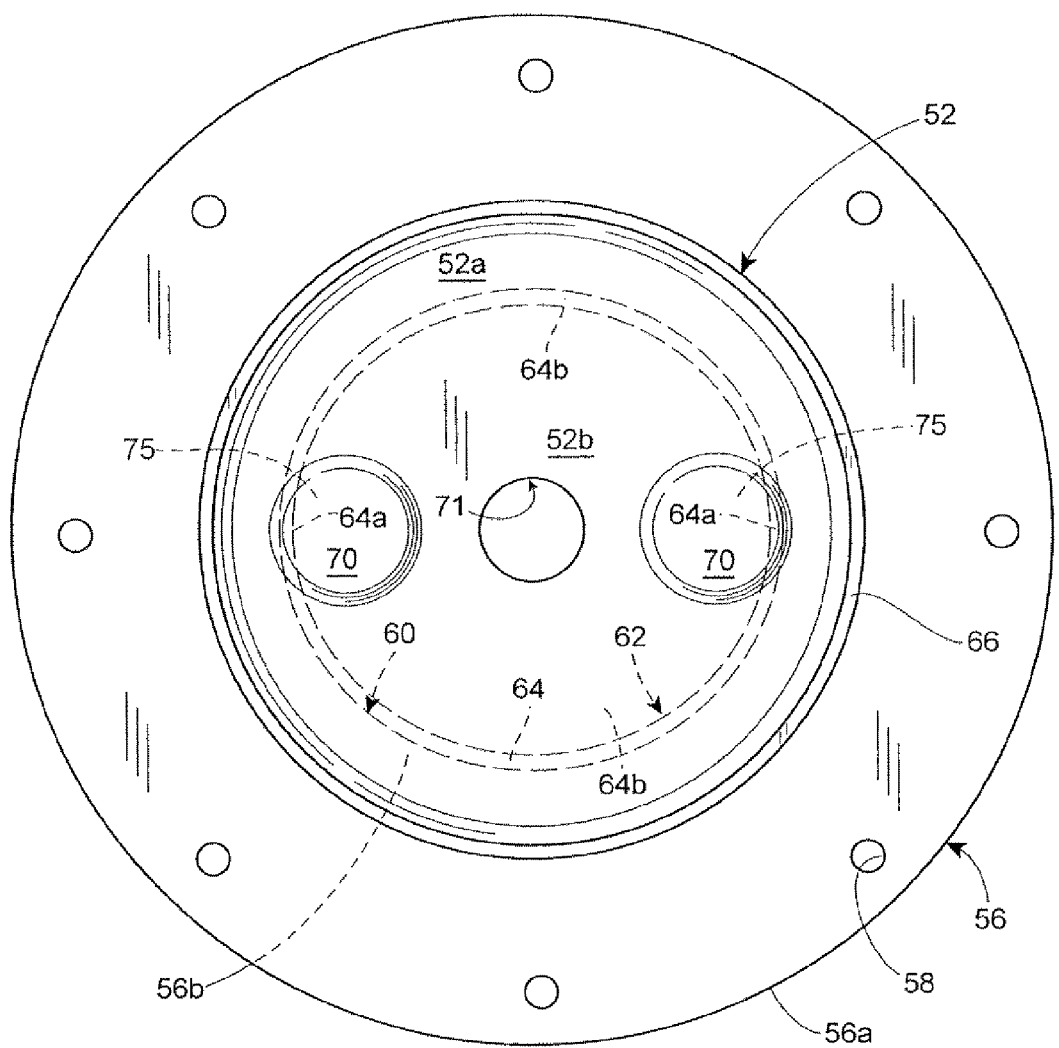
FIG. 4 is a plan view of a diaphragm plate and a diaphragm constructed in accordance with one embodiment of the present invention and taken from the perspective of line IV-TV of FIG. 3.

The inner radial portions 52b, 54b of the diaphragm plates 52, 54 each comprise a plurality of protrusions 70 and a central aperture 71, as depicted in FIG. 4. It should be appreciated that FIG. 4 only depicts the upper diaphragm plate 52 and the diaphragm 56 as the lower diaphragm plate 54 is hidden below the upper diaphragm plate 52 and the diaphragm 56. Nevertheless, the plurality of protrusions 70 of the disclosed embodiment includes two protrusions 70, which are generally circular and have diameters sized and configured to be received by the springs 30. For example, in one embodiment, the protrusions 70 have diameters slightly smaller than inner diameters of the springs 30 such that the protrusions retain the axial position of the springs 30 relative to the diaphragm plates 52, 54. In the disclosed embodiment, the protrusions 70 are formed integral with the diaphragm plates 52, 54 such as by stamping, pressing, or some other known process. Thus, as depicted in FIG. 3, the inner radial portions 52b, 54b of the diaphragm plates 52, 54 further define recesses 73. The recesses 73 are formed in the diaphragm plates 52, 54 opposite the protrusions 70. As depicted in FIG. 2, the recesses 73 of the corresponding diaphragm plates 52, 54 define cavities 75 when the diaphragm assembly 28 is completely assembled.

As is further depicted in FIG. 2, the central apertures 71 of the diaphragm plates 52, 54 are adapted to receive the stem 22 to enable connection of the stem 22 to the diaphragm assembly 28. While both the diaphragm plates 52, 54 define central apertures 71, the central aperture 71 in the lower diaphragm plate 54 comprises a shoulder surface 72 and a bearing surface 74. In the disclosed embodiment, the bearing surface 74 is generally cylindrical and the shoulder surface 72 is generally frustoconical. More specifically, the shoulder surface 72 comprises a generally frustoconical surface adapted for sealing engagement with the shoulder surface 46 (shown in FIG. 3) of the stem 22. For example, in FIG. 2, the shoulder surface 72 of the central aperture 71 defined by the lower diaphragm plate 54 directly engages the shoulder surface 46 of the stem 22. So configured, and as will be described in more detail below, the shoulder surface 72 of the lower diaphragm plate 54 provides for a fluid-tight seal with the shoulder surface 46 of the stem 22 by providing at least a complete, continuous, and constant line of contact therewith. In one embodiment, the mating frustoconical surfaces 36, 72 preferably include highly finished surfaces, thereby providing a complete, continuous, and constant surface contact therebetween. Moreover, the bearing surfaces 74 of the central aperture 71 in the lower diaphragm plate 54 is disposed adjacent the threaded end portion 22b of the stem 22.

Prior to assembly, the inner radial portions 52b, 54b of the diaphragm plates 52, 54 can generally resemble Belleville washers in that they have curved cross-sections, as shown in FIG. 3. For example, the upper diaphragm plate 52 comprises a generally convex cross-section, while the lower diaphragm plate 54 comprises a generally concave cross-section. Therefore, prior to assembly, each of the plates 52, 54 resemble hollow partial spheres or spherical caps. Upon assembly, however, the inner radial portions 52b, 54b are drawn together onto the threaded end portion 22b of the stem 22, thereby substantially flattening the plates 52, 54, as depicted in FIG. 2. In one embodiment, this flattening of the plates 52, 54 may also at least partly increase the diameter of the plates 52, 54.

More specifically, during assembly, the lower diaphragm plate 54 is disposed in a concave orientation on the threaded end portion 22b of the stem 22. So configured, the shoulder surface 72 of the central aperture 71 of the lower diaphragm plate 54 directly engages the shoulder surface 46 of the stem 22, as depicted in FIG. 2. At this stage of the assembly process, the lower diaphragm plate 54 continues to resemble a spherical cap having a generally concave cross-section. Subsequently, the diaphragm 56 is positioned on the lower diaphragm plate 54 such that the inner radial portion 56b of the diaphragm 56 rests on the outer radial portion 54a of the lower diaphragm plate 54. When properly positioned, the bead 64 on the inner edge 60 of the diaphragm 56 lies within the recesses 73 formed in the lower diaphragm plate 54.

With the diaphragm 56 properly positioned on the lower diaphragm plate 54, the upper diaphragm plate 52 is disposed in a convex orientation on the stem 22 such that the central aperture 71 thereof is received on the threaded end portion 22b. At this point, the inner radial portions 52b, 54b of the diaphragm plates 52, 54 define a cavity (not shown) therebetween. Finally, the nut 48 is tightened onto the threaded end portion 22b of the stem 22. Tightening the nut 48 causes the nut 48 to engage the upper diaphragm plate 52 and axially compress the diaphragm plates 52, 54 together. More specifically, the nut 48 flattens and compresses the inner radial portions 52b, 54b of the diaphragm plates 52, 54 into engagement with each other between the nut 48 and the shoulder 22c of the stem 22, as depicted in FIG. 2. After the nut 48 is securely threaded onto the threaded end portion 22b of the stem 22, the retaining nut 50 may be threaded onto the stem 22 and into engagement with the nut 48.

So configured, the outer radial portions 52a, 54a of the diaphragm plates 52, 54 compress and seal against the inner radial portion 56b of the diaphragm 56. FIG. 4 depicts a plan view of the assembly taken from line IV-IV in FIG. 3, with the bolt 48 and retainer 50 removed for clarity, and showing the diaphragm 56 disposed between the upper and lower diaphragm plates 52, 54. As depicted, the bead 64 formed on the inner edge 60 of the diaphragm 56 includes portions 64a disposed within the cavities 75 formed between the recesses 73 in the diaphragm plates 52, 54. Thus, these portions 64a of the bead 64 at least partly secure the diaphragm 56 against pulling out from between the diaphragm plates 52, 54. However, the bead 64 also includes portions 64b that are not disposed within the cavities 75, but rather disposed circumferentially between the cavities 75. These portions 64b are compressed between outer radial portions 52a, 54a of the diaphragm plates 52, 54 to substantially the same thickness as the remainder of the diaphragm 56. Thus, these portion 64b of the bead 64 do not interrupt or interfere with the seal formed between the plates 52, 54 and the diaphragm 56.

Referring back to FIG. 2, as the bolt 48 is threaded onto the stem 22 to compress the diaphragm plates 52, 54, the inner radial portions 52b, 54b of the diaphragm plates 52, 54 urge themselves in opposite directions away from each other. So configured, the shoulder surface 72 of the central aperture 71 of the lower diaphragm plate 54 is forced downward relative to the orientation of the actuator 10 depicted in FIG. 2 and into line-contact, fluid-tight, sealing engagement with the shoulder surface 46 of the stem 22. Furthermore, the inner radial portion 52b of the upper diaphragm plate 52 is forced upward relative to the orientation of the actuator 10 depicted in FIG. 3 and into engagement with the nut 48. In addition to the retaining nut 50 securing the nut 48 on the stem 22, the force applied to the nut 48 by the upper diaphragm plate 52 generates sufficient friction between the threads of the nut 48 and the threads on the threaded end portion 22b to prevent the nut 48 from involuntarily loosening off of the threaded end portion 22b of the stem 22 during prolonged operation of the actuator 10. Thus, the shoulder portion 22c of the stem 22 and the nut 48 retain the diaphragm plates 52, 54 in the compressed and flattened configuration depicted in FIG. 2, which coincidentally applies a tensile load to a portion of the threaded end portion 22b of the stem 22 that is located between the upper and lower diaphragm plates 52, 54.

Therefore, the diaphragm assembly 28 described herein advantageously comprises diaphragm plates 52, 54 designed and configured to compressively engage and seal with a diaphragm 56 while simultaneously and directly sealing against a stem 22 to provide a fluid-tight seal between the upper and lower cavities 27a, 27b of the housing 26, as well as applying a force to retain the nut 48 on the stem 22.

It should be appreciated that while the actuator 10 of the present invention has, thus far, been disclosed as comprising a nut 48 connecting the stem 22 to the diaphragm assembly 28, an alternative embodiment may not require a nut. For example, in one alternative embodiment, the central aperture 71 defined in the upper diaphragm plate 52 may include internal threads. The internal threads of the central aperture 71 may be sized and configured for threaded engagement with the threaded end portion 22b of the stem 22. So configured, the threaded end portion 22b of the stem 22 would be disposed in direct threaded engagement with the internal threads of the upper diaphragm plate 52. Tightening the threaded end portion 22b of the stem 22 to the upper diaphragm plate 52 would draw the inner radial portions 52b, 54b of the diaphragm plates together, as depicted in FIG. 2, for example. In such in embodiment, it should be appreciated that the retaining nut 50 may be utilized to assist in retaining the stem 22 and upper diaphragm plate 52 together, however, the force inherently generated by deforming and compressing the diaphragm plates 52, 54 would generate sufficient friction between the threaded end portion 22b of the stem 22 and the central aperture 71 to prevent the stem 22 from loosening from the upper diaphragm plate 52.

While the diaphragm 56 has been disclosed herein as comprising a bead 64 having a generally circular cross-section formed in the inner edge 60, one alternative embodiment may not comprise a bead 64. Rather, the compressive force generated by the outer radial portions 52a, 54a of the diaphragm plates 52, 54 would sufficiently retain the diaphragm 56 between the diaphragm plates 52, 54. In another alternative embodiment, the diaphragm 56 may comprise multiple bead portions formed on the inner edge 60. For example, in the embodiment depicted in FIG. 4, the diaphragm 56 may only include the bead portions 64a disposed within the cavities 75, but not the bead portions 64b. Such an embodiment would require the technician assembling the actuator 10 to ensure proper location of the bead portions 64a within the cavities 75 during assembly. One of ordinary skill in the art will appreciate that the bead 64 can be constructed to have a cross-section other than circular. For example, alternative embodiments can include a bead 64 with a square, rectangular, triangular, diamond-shaped, or other shaped cross-section.

Figure 6:
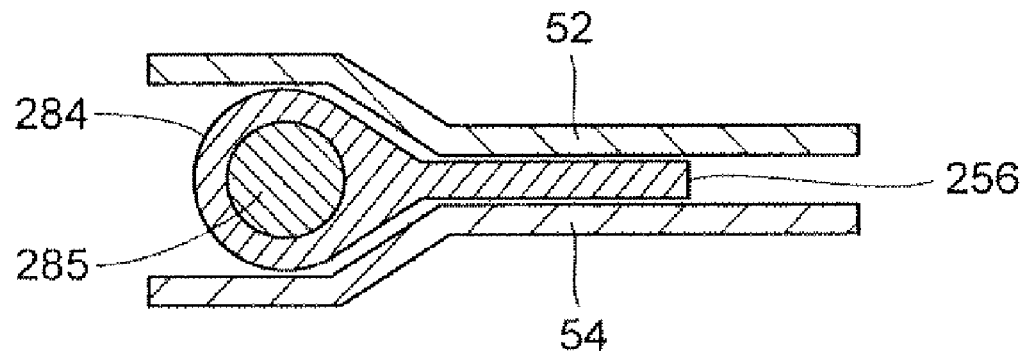
FIG. 6 is a cross-sectional side view of an alternative embodiment of a diaphragm used in connection with an actuator constructed in accordance with the principles of the present invention.

Moreover, in another alternative embodiment, the bead 64 can be constructed to include an inner reinforcing ring 285 such as that depicted in FIG. 6, for example. The inner reinforcing ring 285 depicted in FIG. 6 is disposed within the diaphragm 56 and defines an overmolded bead 264. The overmolded bead 264 is formed of an outer material that is consistent with the material forming the remainder of the diaphragm 56. The inner reinforcing ring 285 can be constructed of a metal, a thermoplastic, a high durometer polymer, a polymer, or any other material capable of serving the principles of the invention. The reinforcing ring 285 can prevent extrusion of the bead 264 in certain applications. While the inner reinforcing ring 285 is depicted in FIG. 6 as having a circular cross-section, alternative embodiments of the reinforcing ring 285 can have generally any shape cross-section.

Figure 7:
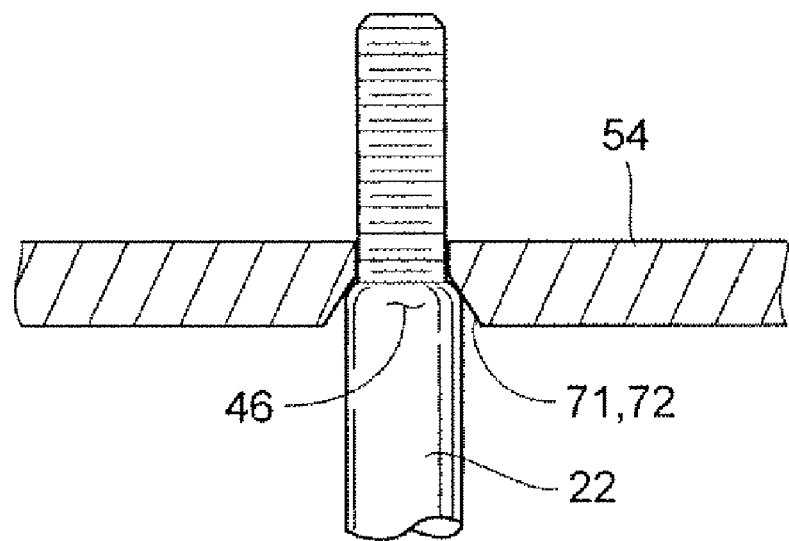
FIG. 7 is partial side view of an alternative embodiment of a stem and diaphragm plate of an actuator constructed in accordance with the principles of the present invention.

Further yet, while the lower diaphragm plate 54 has been disclosed herein as comprising a central aperture 71 including a generally frustoconical shoulder surface 72 adapted for direct sealing engagement with a corresponding frustoconical shoulder surface 46 of the stem 22, alternative embodiments of the diaphragm assembly 28 may comprise alternative configurations. For example, one alternative embodiment may include a lower diaphragm plate 54 having a central aperture 71 with a stepped surface adapted for direct sealing engagement with a stepped surface formed on the stem 22. In another alternative embodiment, the central aperture 71 and the stem 22 may simply include flat surfaces adapted for direct sealing engagement. In still another embodiment, one of the stem 22 and the central aperture 71 may include a collar and the other may include an annular recess adapted to receive the collar in a snap-fit sealing engagement. In still yet another alternative embodiment, either or both of the shoulder surfaces 46, 72 can include a bull-nosed surface. For example, FIG. 7 depicts one alternative embodiment where the shoulder surface 46 on the stem 22 includes a bull-nosed surface and the surface 72 of the central aperture 71 in the lower diaphragm plate 54 includes a frustoconical surface. So configured, the bull-nosed surface 46 helps maintain the line of contact providing the fluid-tight seal between the stem 22 and the lower diaphragm plate 54 even if the stem 22 and the plate 54 become misaligned, for example. In other alternative embodiments, the shoulder surface 46 can be frustoconical, and the surface 72 on the lower diaphragm plate 54 can be bull-nosed; or alternatively, both surfaces 46, 72 can be bull-nosed. In any event, it should be appreciated that the present invention is not limited to the geometrical configurations of the surfaces 72, 46 specifically disclosed herein, but rather is intended to include all geometries that a person having ordinary skill in the art would deem to be within the scope and terms of the claims.

Still further, while the diaphragm plates 52, 54 have been disclosed herein with reference to FIG. 4 as including a pair of protrusions 70 serving as spring seats for a pair of springs 30, alternative embodiments may include any number of springs 30 and protrusions 70 acting as spring seats.

Figure 5:
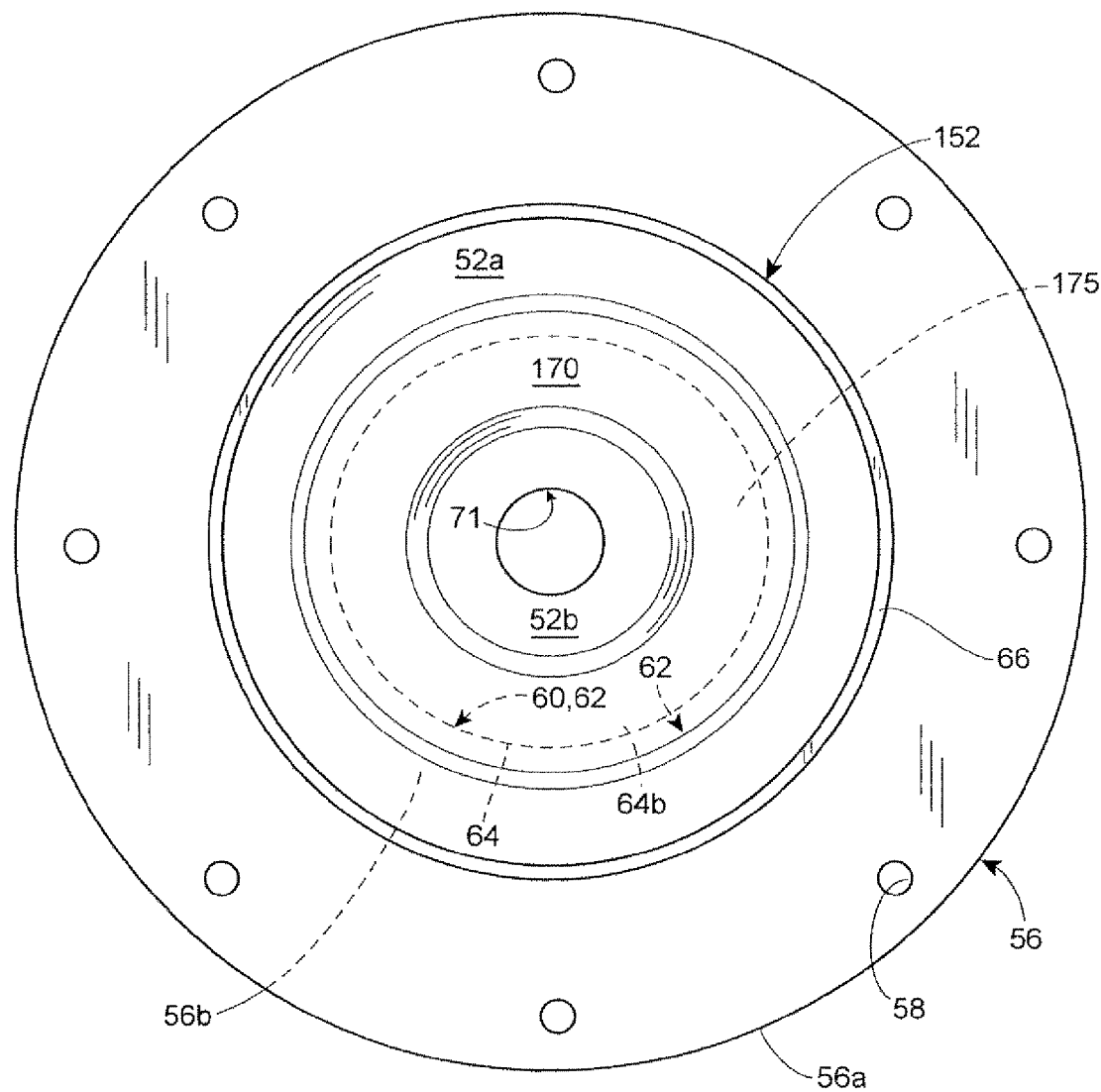
FIG. 5 is a plan is a plan view of a diaphragm plate and a diaphragm constructed in accordance with an alternative embodiment of the present invention and taken from the perspective of line IV-IV of FIG. 3.

Further still, while the diaphragm plates 52, 54 have been disclosed herein as including a pair of protrusions 70 that are spaced circumferentially apart, thereby adapted to accommodate circumferentially spaced springs 30, an alternative embodiment may be configured to accommodate one or more springs disposed concentrically with the diaphragm plates 52, 54. For example, FIG. 5 depicts an alternative embodiment of the diaphragm plates 152, 154 including circumferential protrusions 170. It should be appreciated that FIG. 5 only depicts the upper diaphragm plate 152 and the diaphragm 56 as the lower diaphragm plate 154 is hidden below the upper diaphragm plate 152 and the diaphragm 56.

Nevertheless, the diaphragm plates 152, 154 of the embodiment disclosed in FIG. 5 also include circumferential recesses 173 that define a circumferential cavity 175 when assembled onto the stem 22 of the actuator 10. The cross-section of the cavity 175 of the embodiment depicted in FIG. 5, therefore, would be illustrated identical to cross-section of the multiple cavities 75 illustrated in FIG. 2. However, a distinction between the configuration depicted in FIG. 4 and the configuration depicted in FIG. 5 is that the circumferential cavity 175 receives or accommodates the entire bead 64 on the inner edge 60 of the diaphragm 56. Additionally, the circumferential protrusions 170 of the diaphragm plates 152, 154 are adapted to act as a spring seat to accommodate one or more springs disposed concentrically with the diaphragm plates 152, 154. For example, in one embodiment, a first spring having a diameter that is slightly smaller than the inner diameter of the protrusion 170 may be seated on the upper diaphragm plate 152 within the protrusion 170. The protrusion 170 would therefore prevent the spring from displacing radially relative to the upper diaphragm plate 152.

Another embodiment may alternatively or supplementally include another spring having a diameter that is slightly larger than the outer diameter of the protrusion 170. So configured, this spring may be seated on the upper diaphragm plate 152 such that it receives the protrusion 170 to thereby limit its radial displacement. Therefore, it should be appreciated that other variations of the diaphragm plates and spring configurations may be within the scope of the present invention.

Additionally, while the protrusions 70 forming the spring seats have been disclosed herein as being formed integral with the diaphragm plates 52, 54, alternative embodiments may include spring seats that are not integrally formed with the diaphragm plates 52, 54. For example, in one alternative embodiment, the diaphragm assembly 28 may include spring seats welded onto, bolted onto, or otherwise attached to the diaphragm plates 52, 54. In still a further embodiment, the diaphragm plates 52, 54 may not include spring seats at all, but rather the upper and/or lower housing components 32, 34 may include spring seats.

In light of the foregoing, the disclosed actuator 10 provides a diaphragm assembly 28 which requires a minimum number of parts and assembly steps. Moreover, the diaphragm assembly 28 advantageously provides spring loaded diaphragm plates 52, 54 that, when assembled, directly and forcibly engage the stem 22, as well as the diaphragm 56, to provide a fluid-tight seal between the upper and lower cavities 27a, 27b of the housing 26. The diaphragm assembly 28 disclosed herein does not require the incorporation of o-rings, rubber gaskets, or any other type of seal, which tend to require replacement after prolonged use. Accordingly, the diaphragm assembly 28 provides for an effective and reliable actuator 10.

Moreover, the forces generated by the compressed diaphragm plates 52, 54 enable the diaphragm assembly 28 disclosed herein to advantageously require only a single nut 48 for attaching the diaphragm plates 52, 54 to the stem 22. As discussed above, when the nut 48 compresses the diaphragm plates 52, 54, the upper diaphragm plate 52 applies an axial load to the nut 48 which generates sufficient friction between the threads of the nut 48 and the stem 22. Furthermore, it should be appreciated the annular design of the diaphragm 56 disclosed herein advatageously reduces the cost of the actuator 10. Specifically, the design of the diaphragm assembly 28 enables the diaphragm 56 to be constructed with the inner opening 62, which greatly reduces the amount of required diaphragm material.

Further still, the identical nature of the diaphragm plates 52, 54 provides for an actuator 10 that is easily reversible between the biased-closed configuration, which is disclosed herein, and a biased open-configuration. For example, to switch the actuator to a biased-open configuration, a technician or other engineer must only open the housing 26 of the actuator 10 and reposition the springs 30 beneath the diaphragm assembly 28 and in engagement with the protrusions 70 formed in the lower diaphragm plate 54.

In light of the foregoing, the description of the present disclosure should be understood as merely providing examples of the present invention and, thus, variations that do not depart from the gist of the invention are intended to be within the scope of the claims.

What is claimed:

1. An actuator for a fluid process control device, comprising:
    a housing comprising a first housing component and a second housing component;
    a diaphragm comprising an outer radial portion and an inner radial portion, the outer radial portion of the diaphragm carried between the first and second housing components;
    a stem operatively coupled to the diaphragm for controlling the fluid process control device;
    a plate assembly comprising a first plate and a second plate connecting the stem and the diaphragm, the plate assembly applying a compressive load to the inner radial portion of the diaphragm; and
    a tensile load generated by the first and second plates urging themselves in opposite directions away from each other, the tensile load applied to the stem at a location between the first plate and the second plate to provide a fluid tight seal between the plate assembly and the stem.

2. The actuator of claim 1, wherein the first plate comprises a concave plate and the second plate comprises a convex plate.

3. The actuator of claim 2, further comprising deformation of at least one of the concave and convex plates, the deformation generating the tensile load on the stem.

4. The actuator of claim 1, wherein the stem comprises a shoulder surface in sealing engagement with one of the first and second plates of the plate assembly.

5. The actuator of claim 4, wherein the shoulder surface comprises a frustoconical surface and the first plate defines a central aperture comprising a frustoconical surface engaging the frustoconical surface of the shoulder.

6. The actuator of claim 4, wherein the first plate defines a central aperture and at least one of the central aperture and the shoulder surface of the stem comprises a bull-nosed surface.

7. The actuator of claim 4, wherein the stem further comprises a threaded end portion.

8. The actuator of claim 6, further comprising a nut threaded onto the threaded end portion of the stem, thereby compressing the inner radial portions of the first and second plates together between the shoulder and the nut.

9. The actuator of claim 7, wherein the second plate defines a threaded aperture in threaded engagement with the threaded end portion of the stem.

10. The actuator of claim 1, wherein the diaphragm comprises an inner radial edge defining an inner opening.

11. The actuator of claim 10, wherein the inner radial edge of the diaphragm comprises a circumferential bead.

12. The actuator of claim 11, wherein the inner radial edge of the diaphragm comprises an overmolded inner reinforcing ring.

13. The actuator of claim 11, wherein the bead includes a cross-section that is one of circular, triangular, rectangular, and diamond-shaped.

14. The actuator of claim 11, wherein the plate assembly defines at least one cavity receiving at least a portion of the circumferential bead of the diaphragm.

15. An actuator for a fluid process control device, comprising:
   a housing comprising a first housing component and a second housing component;
   a stem slidably disposed within the housing and comprising a shoulder;
   a concave plate comprising an inner radial portion disposed on the stem and an outer radial portion, the inner radial portion of the concave plate defining a central aperture;
   a convex plate comprising an inner radial portion and an outer radial portion, the inner radial portion of the convex plate disposed on the stem adjacent the inner radial portion of the concave plate;
   a diaphragm comprising an outer radial portion and an inner radial portion, the outer radial portion of the diaphragm compressed between the first and second housing components and the inner radial portion compressed between the outer radial portions of the concave and convex plates;
   a nut in threaded engagement with the stem and compressing the inner radial portions of the concave and convex plates together; and
   a tensile load generated by the concave and convex plates urging themselves in opposite directions away from each other, the tensile load applied to the stem at a location between the concave and convex plates such that the concave plate directly sealingly engages the shoulder of the stem.

16. The actuator of claim 15, wherein the concave plate provides a line of contact with the stem to provide a fluid-tight seal therewith.

17. The actuator of claim 16, wherein the central aperture of the concave plate comprises a frustoconical surface in sealing engagement with a frustoconical surface of the shoulder of the stem.

18. The actuator of claim 16, wherein at least one of the central aperture of the concave plate and the shoulder of the stem comprises a bull-nosed surface.

19. The actuator of claim 15, wherein the stem comprises a threaded end portion disposed opposite the concave and convex plates from the shoulder.

20. The actuator of claim 19, wherein the nut is threaded onto the threaded end portion of the stem.

21. The actuator of claim 19, wherein the inner radial portion of the convex plate defines a threaded aperture in threaded engagement with the threaded end portion of the stem.

22. The actuator of claim 15, wherein the diaphragm comprises an inner radial edge defining an inner opening.

23. The actuator of claim 22, wherein the inner radial edge of the diaphragm comprises a circumferential bead.

24. The actuator of claim 23, wherein the inner radial edge of the diaphragm comprises an overmolded inner reinforcing ring.

25. The actuator of claim 23, wherein the bead includes a cross-section that is one of circular, triangular, rectangular, and diamond-shaped.

26. The actuator of claim 22, further comprising a cavity disposed between the concave and convex plates, the cavity receiving at least a portion of the circumferential bead.

* * * * *

UNITED STATES PATENT AND TRADEMARK OFFICE
CERTIFICATE OF CORRECTION

| | |
|---|---|
| PATENT NO. | : 7,832,327 B2 |
| APPLICATION NO. | : 11/952753 |
| DATED | : November 16, 2010 |
| INVENTOR(S) | : Douglas P. Gethmann et al. |

It is certified that error appears in the above-identified patent and that said Letters Patent is hereby corrected as shown below:

At Column 4, line 34, "22b The" should be -- 22b. The --.

At Column 7, line 1, "portion" should be -- portions --.

At Column 10, line 4, "advatageously" should be -- advantageously --.

Signed and Sealed this
Twenty-first Day of June, 2011

David J. Kappos
*Director of the United States Patent and Trademark Office*